UNITED STATES PATENT OFFICE 1,976,203

ORE CONCENTRATION

William Trotter, San Francisco, and Eltoft Wray Wilkinson, Berkeley, Calif., assignors to Minerals Separation North American Corporation, New York, N. Y., a corporation of Maryland No Drawing. Application April 11, 1932, Serial No. 604,650

17 Claims. (Cl. 209—166)

This invention relates to the concentration of ores by the aid of compounds formed by the reaction of metal organic monothiocarbonates and acyl chlorides.

Metallic organic monothiocarbonates have the general formula RO.C:O.SM, wherein M is a metal and R is an organic group, such as an alkyl, aralkyl or furfuryl group; and acyl chlorides are compounds of the general formula R' Cl$_x$, wherein $x$ is a whole number, formed by the replacement of a hydroxyl group of an acid by a chlorine atom—e. g. furoyl chloride $C_4H_3OCOCl$ is formed by substituting a chlorine atom for the hydroxyl group in furoic acid, $C_4H_3O.C:O.OH$. R' in the foregoing may be termed the acyl chloride radical or acyl radical. The group RO.C:O.S may be called an acid radical.

In the following examples the monothiocarbonates and acyl chlorides were usually added in admixture and in such proportions that the amount of the metal of the former was chemically equivalent to the chlorine in the latter. Useful though different compounds were sometimes obtained when other proportions of the reacting ingredients were used. The reacting substances were mixed as solutions or suspensions in suitable liquid diluents, with cooling if needed to control the reaction.

Generally the diluents must be chosen that do not react with the original compounds, or with the product of their reaction. Acetone was found a useful diluent in many cases, the reaction product being poured into water which dissolved the metallic chloride and precipitated the organic product. Ether was also used as a diluent in several examples, the by-product potassium chloride formed in such cases being removed by filtration, and the desired organic reaction product being obtained by evaporation of the ether from the filtrate. Water may be used as the diluent in cases where the decomposition by it of the acyl chloride used is slow, as in the case of furoyl chloride. In such case the by-product potassium chloride dissolved in the water and the desired insoluble reaction product was separated in the usual way. Petroleum ether was also found to be a useful diluent.

In preparing these reaction products there were used the potassium salts of:—

Ethyl monothiocarbonic acid
n-butyl monothiocarbonic acid
Amyl (diethyl carbinol) monothiocarbonic acid
Benzyl monothiocarbonic acid
Furfuryl monothiocarbonic acid and the following acyl chlorides:

Acetyl chloride
Benzoyl chloride
Cinnamoyl chloride
Dimethylbenzenesulpho chloride
Furoyl chloride
Succinyl chloride
Benzene sulphone chloride
Ethyl chlorocarbonate.

Some of the reaction products were obtained in crystalline form, while others were recovered in the form of oils, which could be neither crystallized nor distilled, but which in the crude state were found useful in flotation concentration.

Some of these reaction products were relatively unstable, such as the acetyl chloride derivatives of monothiocarbonates, but were prepared and found useful in flotation.

Typical examples of the preparation of these reaction products follow:

(1) Equimolecular quantities of benzoyl chloride and potassium ethyl monothiocarbonate were diluted with acetone, cooled by ice water, and slowly mixed. The reaction took place spontaneously, and when the mixture was poured into water the liquid reaction product settled out and the by-product potassium chloride dissolved in the water. 45 grams of benzoyl chloride gave 57 grams of reaction product, which was found useful in flotation. When acetone was used as solvent in preparing the reaction product and an excess of potassium ethyl monothiocarbonate was present, or was added subsequently, a red oil was formed which was useful in flotation.

(2) Acetyl chloride dissolved in ether was slowly added to an equivalent quantity of potassium ethyl monothiocarbonate suspended in ether and cooled by ice and water.

The potassium chloride formed was removed by filtration, and the ether removed from the filtrate by suction, leaving as a residue, the acyl chloride-thiocarbonate-reaction product found useful in flotation tests described later.

(3) Furoyl chloride was slowly added with mechanical stirring to its equivalent quantity of potassium ethyl monothiocarbonate in an aqueous solution, cooled with ice water to about 10° C. A large yield of white crystals, melting at 51.5° C.–52° C. was recovered by filtration.

The same reactants, furoyl chloride and potassium ethyl monothiocarbonate, when mixed in acetone as the diluent and then poured into water, gave similar white crystals having the same melting point.

In the presence of acetone the addition of further potassium ethyl monothiocarbonate resulted in the formation of a red oily compound which proved useful in flotation.

(4) Succinyl chloride dissolved in ether was stirred with cooling into an ether suspension of potassium ethyl monothiocarbonate in the proportions of one molecule of the succinyl chloride to two of the potassium ethyl monothiocarbonate. The reaction mixture was filtered, and on evaporation of the etheral filtrate, colorless crystals were obtained. These melted between 31° C. and 32° C. and were found useful in flotation. Their sulphur content was 20.55%.

In acetone the reaction product quickly decomposed in the presence of excess potassium ethyl monothiocarbonate.

Some of the reactions appear to take place as follows:

The admixture of furoyl chloride and potassium ethyl monothiocarbonate was found to yield a compound of the formula

C₂H₅O.C:O.S.C:O.C₄H₃O.

with KCl as a by-product.

Similarly benzoyl chloride and potassium ethyl monothiocarbonate gave

C₂H₅O.C:O.S.C:O.C₆H₅.

Similarly the reaction between succinyl chloride and potassium ethyl monothiocarbonate gave

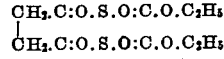
CH₂.C:O.S.O:C.O.C₂H₅
|
CH₂.C:O.S.O:C.O.C₂H₅

In these examples, therefore, the compounds are produced by the action of an acyl chloride on a metal monothiocarbonate in such a way that the metal chloride by-product is produced, and the acyl radical unites with the monothiocarbonate radical through its sulphur atom to produce a compound of the general formula

R'(S.C:O.OR)ₓ, the general expression for the reaction being

R'Clₓ + x.MS.C:O.OR = xMCl + R'(S.C:O.OR)ₓ where R' is an acyl group, e. g. the C₆H₅C:O. group from benzoyl chloride, x is the number of chlorine atoms in the acyl chloride, viz. the valence of its radical, M is a metal, and R may be an alkyl, aralkyl or furfuryl group, such that R OH is an alcohol such as ethyl, benzyl or furfuryl alcohol.

Reaction products made as described, from the acyl chlorides and metal-organic-monothiocarbonates listed above, were tested as modifying agents in the froth-flotation concentration of various ores, with the results indicated below.

In carrying out the process of the invention mineral-frothing agents and such other flotation agents as were useful were used as shown in the following examples.

The reaction product of the organic substance furoyl chloride and potassium ethyl monothiocarbonate was used in the concentration of a very low grade lot of Utah copper ore, as follows:

The ore was ground wet in a ball mill with six pounds of calcium oxide and 0.1 pound of the reaction product of furoyl chloride and potassium ethyl monothiocarbonate, both per ton of ore, water added, agitated with 0.4 pound of cresol per ton of ore, and a froth-concentrate separated. The heads contained 0.52% copper, the concentrate contained 5.04% copper, and the tailings 0.08% copper, representing a recovery of 86% of the copper.

The same reaction product was used in the concentration of Nevada Consolidated ore. The ore was ground wet in a ball mill with five pounds of calcium oxide and 0.1 pound of the reaction product of furoyl chloride and potassium ethyl monothiocarbonate, both per ton of ore, water added, agitated with 0.1 pound of pine oil per ton of ore, and a froth-concentrate separated. The heads contained 1.2% copper, the concentrate contained 15.36% copper, and the tailings contained 0.22% copper, representing a recovery of 82.7%.

The same reaction product was used in the differential concentration of lead and zinc from the Bunker Hill and Sullivan lead-zinc ore. The ore was ground wet with four pounds of sodium carbonate, 0.2 pound of sodium cyanide, and one pound of zinc sulphate, all per ton of ore, water added, agitated with 0.1 pound of the reaction product of furoyl chloride with potassium ethyl monothiocarbonate, and with 0.1 pound of cresol, all per ton of ore, and a lead-bearing froth separated.

Then there was added to the pulp another 0.1 pound of the same reaction product, two pounds of sodium carbonate, one pound of copper sulphate, and 0.4 pound of Barrett #4, all per ton of original ore, and the pulp was agitated to yield a zinc-bearing froth.

The results are shown in the following table:

| Product | Assays | | Percent recoveries | |
|---|---|---|---|---|
| | Pb percent | Zn percent | Pb | Zn |
| Heads | 6.4 | 13.4 | 100.0 | 100.0 |
| Pb concs | 46.2 | 16.2 | 85.6 | 14.4 |
| Zn concs | 2.2 | 42.3 | 8.5 | 79.5 |
| Tails | 0.6 | 1.3 | 5.9 | 6.1 |

Retreatment of the concentrates yielded a finished lead-concentrate containing 63.6% of lead and a finished zinc-concentrate containing 53% of zinc.

The reaction product of furoyl chloride with potassium amyl monothiocarbonate was used in the concentration of Nevada Consolidated ore. The ore was ground wet in a ball mill with five pounds of calcium oxide and 0.1 pound of the reaction product of furoyl chloride and potassium amyl monothiocarbonate, both per ton of ore, water added, agitated with 0.1 pound of pine oil per ton of ore, and a froth-concentrate separated. The heads contained 1.14% copper, the concentrate 14.56% copper, and the tailings 0.15% copper, representing a recovery of 88% of the copper.

The reaction product of furoyl chloride with potassium benzyl monothiocarbonate was used in the concentration of Nevada Consolidated ore. The ore was ground wet in a ball mill with five pounds of calcium oxide and 0.1 pound of the reaction product of furoyl chloride and potassium benzyl monothiocarbonate, both per ton of ore, water added, agitated with 0.1 pound pine oil per ton of ore, and a froth-concentrate separated. The heads contained 1.15% copper, the concentrate 13.2% copper and the tailings 0.15% copper, representing a recovery of 88.4% of the copper.

The reaction product of acetyl chloride and potassium ethyl monothiocarbonate was used in the concentration of Nevada Consolidated ore. The ore was ground wet in a ball mill with five pounds of calcium oxide and 0.1 pound of the reaction product of acetyl chloride and potassium ethyl monothiocarbonate, both per ton of ore, water added, agitated with 0.1 pound of cresol per ton of ore, and a froth-concentrate separated. The heads contained 1.15% copper, the concentrate 12.32% copper, and the tailings 0.22% copper, representing a recovery of 82.4% of the copper.

The same reaction product was used in the differential concentration of the lead and zinc in Bunker Hill and Sullivan ore. The ore was ground wet with four pounds of sodium carbonate, 0.2 pound sodium cyanide, and one pound zinc sulphate, all per ton of ore, water added, agitated with 0.1 pound of cresol and 0.1 pound of the reaction product of acetyl chloride and potassium ethyl monothiocarbonate, both per ton of ore, and a lead-bearing froth separated.

Then there was added two pounds of sodium carbonate, one pound of copper sulphate, 0.1 pound of the same reaction product, 0.35 pound of Barrett #4, all per ton of original ore, and the pulp agitated to yield a zinc-bearing froth.

The results are shown in the following table:

| Product | Assays | | Percent recoveries | |
|---|---|---|---|---|
| | Pb percent | Zn percent | Pb | Zn |
| Heads | 6.2 | 13.8 | 100.0 | 100.0 |
| Pb concs | 45.9 | 15.9 | 88.5 | 13.7 |
| Zn concs | 2.3 | 41.2 | 9.8 | 79.7 |
| Tails | 0.17 | 1.5 | 1.7 | 6.6 |

Retreatment of the concentrates yielded a finished lead-concentrate containing 61.6% lead and a finished zinc-concentrate containing 52% of zinc.

The reaction product of acetyl chloride with potassium butyl monothiocarbonate was used in the concentration of Anaconda copper ore. The ore was ground wet in a ball mill with five pounds of calcium oxide per ton of ore, water added, agitated with 0.05 pound of Scotch blast furnace oil, 0.1 pound of pine oil, and 0.1 pound of the reaction product of acetyl chloride with potassium butyl monothiocarbonate, all per ton of ore, and a froth-concentrate separated. The heads contained 5.13% copper, the concentrate 25.04% copper, and the tailings 0.24% copper, representing a recovery of 96.2% of the copper.

The same reaction product was used in the concentration of Clay Mine ore. The ore was ground wet in a ball mill with three pounds of calcium oxide per ton of ore, water added, agitated with 0.2 pound cresol and 0.1 pound of the reaction product of acetyl chloride with potassium butyl monothiocarbonate, both per ton of ore, and a froth-concentrate separated. The heads contained 1.01% copper, the concentrate 10.32% copper, and the tailings 0.22% copper, representing recovery of 79.9% of the copper.

The reaction product of succinyl chloride and potassium ethyl monothiocarbonate was used in the concentration of Nevada Consolidated ore. The ore was ground wet in a ball mill with five pounds of calcium oxide and 0.1 pound of the reaction product of succinyl chloride and potassium ethyl monothiocarbonate, both per ton of ore, water added, agitated with 0.1 pound of pine oil per ton of ore, and a froth-concentrate separated. The heads contained 1.37% copper, the concentrate 23.84% copper, and the tailings 0.28% copper, representing a recovery of 79.9% of the copper.

The reaction product of succinyl chloride and potassium butyl monothiocarbonate was used in the concentration of Clay Mine ore. The Clay Mine ore was ground in a ball mill with three pounds of calcium oxide, per ton of ore, water added, agitated with 0.2 pound of cresol and 0.1 pound of the reaction product of succinyl chloride and potassium butyl monothiocarbonate, both per ton of ore. The heads contained 1.07% copper, the concentrate 6.8% copper, and the tailings 0.3% copper, representing a recovery of 75.4% of the copper.

The same reaction product was used in the concentration of Anaconda copper ore. The Anaconda ore was ground with five pounds of calcium oxide per ton of ore, water added, agitated with 0.05 pound of Scotch blast furnace oil, 0.1 pound pine oil and 0.1 pound of the reaction product of succinyl chloride with potassium butyl monothiocarbonate, all per ton of ore. The heads contained 5.04% copper, the concentrate 22.72% copper, and the tailings 0.28% copper, representing a recovery of 95.6% of the copper.

The reaction product of cinnamoyl chloride and potassium benzyl monothiocarbonate was used in the concentration of Anaconda copper ore. The ore was ground wet in a ball mill with five pounds of calcium oxide per ton of ore, water added, agitated with 0.05 pound of Scotch blast furnace oil, 0.1 pound pine oil, and 0.1 pound of the reaction product of cinnamoyl chloride and potassium benzyl monothiocarbonate, all per ton of ore, and a froth-concentrate separated. The heads contained 5.12% copper, the concentrate 27.04% copper, and the tailings 0.28% copper, representing a recovery of 95.5% of the copper.

The reaction product of benzoyl chloride and potassium ethyl monothiocarbonate was used in the concentration of Nevada Consolidated ore. The ore was ground wet in a ball mill with five pounds of calcium oxide and 0.1 pound of the reaction product of benzoyl chloride and potassium ethyl monothiocarbonate, both per ton of ore, water added, agitated with 0.1 pound of pine oil per ton of ore and a froth-concentrate separated. The heads contained 1.19% of copper, the concentrate 14.88% copper, and the tailings 0.22% copper, representing a recovery of 82.7% of the copper.

The reaction product of benzoyl chloride and potassium butyl monothiocarbonate was used in the concentration of Clay Mine ore. The ore was ground in a ball mill with three pounds of calcium oxide, water added, agitated with 0.2 pound cresol and 0.1 pound of the reaction product of benzoyl chloride and potassium butyl monothiocarbonate, all per ton of ore, and a froth-concentrate separated. The heads contained 1.05% copper, the concentrate 7.52% copper, and the tailings 0.26% copper, representing a recovery of 77.9% of the copper.

The same reaction product was used in the concentration of Anaconda copper ore. The ore was ground wet in a ball mill with five pounds of calcium oxide, water added, agitated with 0.05 pound Scotch blast furnace oil, 0.1 pound pine oil, and 0.1 pound of the reaction product of benzoyl chloride with potassium butyl monothiocarbonate, all per ton of ore, and a froth-concentrate separated. The heads contained 5.11% copper, the concentrate 25.32% copper, and the tailings 0.24% copper, representing a recovery of 96.2% of the copper.

The reaction product of benzoyl chloride and potassium furfuryl monothiocarbonate was used in the concentration of Clay Mine ore. The ore was ground wet in a ball mill with three pounds calcium oxide, water added, agitated with 0.2 pound cresol and 0.1 pound of the reaction product of benzoyl chloride and potassium furfuryl monothiocarbonate, all per ton of ore, and a froth-concentrate separated. The heads contained 1.07% copper, the concentrate 8.32% copper, and the tailings 0.26% copper, representing a recovery of 78% of the copper.

The same reaction product was used in the concentration of Anaconda copper ore. The ore was ground wet in a ball mill with five pounds of calcium oxide, water added, agitated with 0.05 pound of Scotch blast furnace oil, 0.1 pound pine oil, and 0.1 pound of the reaction product of benzoyl chloride and potassium furfuryl monothiocarbonate, and a froth-concentrate separated. The heads contained 5.15% copper, the concentrate 29.28% copper, and the tailings 0.42% copper, representing a recovery of 93.2% of the copper.

The reaction product of benzene sulphone chloride ($C_6H_5SO_2Cl$) and potassium ethyl monothiocarbonate was used in the concentration of Nevada Consolidated ore. The ore was ground wet in a ball mill with five pounds of calcium oxide and 0.1 pound of the reaction product of benzene sulphone chloride and potassium ethyl monothiocarbonate both per ton of ore, water added, agitated with 0.1 pound of pine oil per ton of ore, and a froth-concentrate separated. The heads contained 1.18% copper, the concentrates 12.72% copper, and the tailings 0.22% copper, representing a recovery of 82.8% of the copper.

The reaction product of dimethylbenzenesulpho chloride with potassium butyl monothiocarbonate was used in the concentration of Anaconda copper ore. A pulp of the ground ore was agitated with five pounds of calcium oxide, 0.05 pound Scotch blast furnace oil, 0.1 pound of pine oil, and 0.1 pound of the reaction product of dimethylbenzenesulpho chloride and potassium butyl monothiocarbonate, all per ton of ore, and a froth-concentrate separated. The heads contained 5.11% copper, the concentrate 27.04% copper, and the tailings 0.30% copper, representing a recovery of 95.2% of the copper present.

The reaction product of so-called ethyl-chlorocarbonate (sometimes referred to as ethyl-chloroformate) with potassium ethyl monothiocarbonate, was used in the concentration of Nevada Consolidated ore. The ore was ground wet in a ball mill with 5 pounds of calcium oxide and 0.1 pound of the reaction product of ethyl-chlorocarbonate and potassium ethyl monothiocarbonate, both per ton of ore, water added, agitated with 0.1 pound pine oil per ton of ore, and a froth concentrate separated. The heads contained 1.16% copper, the concentrate 14.96% copper, and the tailings 0.20% copper, representing a recovery of 83.9% of the copper.

The reaction product of so-called ethyl-chlorocarbonate (sometimes referred to as ethyl-chloroformate) with potassium amyl (diethylcarbinol) monothiocarbonate was used in the concentration of Nevada Consolidated ore. The ore was ground wet in a ball mill with five pounds of calcium oxide and 0.1 pound of the reaction product of ethyl-chlorocarbonate and potassium amyl monothiocarbonate, both per ton of ore, and water added, agitated with 0.1 pound of pine oil per ton of ore, and a froth concentrate separated. The heads contained 1.14% copper, the concentrate 14.56% copper, and the tailings 0.15% copper, representing a recovery of 88.0% of the copper.

Having thus described certain embodiments of the invention, what is claimed is:

1. The process of concentrating an ore which includes agitating a pulp of the ore with the reaction product of an acyl chloride and a metal organic monothiocarbonate to yield a floating concentrate, and separating the concentrate.

2. The process of concentrating an ore which includes agitating a pulp of the ore with a compound having the constitution $R'(R{-}OCOS)_x$, where $R'$ is an acyl radical containing an organic group, and R is an alkyl or aralkyl or furfuryl group, and $x$ is a whole number representing the valence of $R'$, so as to yield a float concentrate, and separating the concentrate.

3. The process of concentrating an ore which includes agitating a pulp of the ore with a compound consisting of an organic acyl radical united with the group constituting the acid radical of an organic monothiocarbonate, so as to yield a float concentrate, and separating the concentrate.

4. The process of concentrating an ore which includes agitating a pulp of the ore with the reaction product of a metal monothiocarbonate containing an organic group, the organic group being taken from the class consisting of alkyl, aralkyl and furfuryl groups, and an organic acyl, so as to yield a floating concentrate, and separating the concentrate.

5. The process of concentrating an ore which includes agitating a pulp of the ore with the reaction product of a potassium aralkyl monothiocarbonate and an acyl chloride, so as to yield a floating concentrate, and separating the concentrate.

6. The process of concentrating an ore which includes agitating a pulp of the ore with the reaction product of a potassium alkyl monothiocarbonate and an acyl chloride, so as to yield a floating concentrate, and separating the concentrate.

7. The process of concentrating an ore which includes agitating a pulp of the ore with the reaction product of potassium furfuryl monothiocarbonate and an acyl chloride, so as to yield a floating concentrate, and separating the concentrate.

8. The process of concentrating an ore which includes agitating a pulp of the ore with a compound containing the acid radical of an organic monothiocarbonate united to an acyl chloride radical, so as to yield a floating concentrate, and separating the concentrate.

9. The process of concentrating an ore which includes agitating a pulp of the ore with a compound containing the acid radical of an organic monothiocarbonate which includes an alcohol-forming group, and also containing an acyl radical, so as to yield a floating concentrate, and separating the concentrate.

10. The process of concentrating an ore which includes agitating a pulp of the ore with a compound containing the acid radical of an organic monothiocarbonate which includes an alcohol-forming group, and also containing an acyl radical containing an organic group, so as to yield a floating concentrate, and separating the concentrate.

11. The process of concentrating an ore which includes agitating a pulp of the ore with a compound containing the acid radical of an organic monothiocarbonate which includes an alcohol-forming group, and also containing an acyl radical containing sulphur, so as to yield a floating concentrate, and separating the concentrate.

12. The process of concentrating an ore which includes agitating a pulp of the ore with a compound containing the acid radical of an organic monothiocarbonate which includes an alcohol-forming group, and also containing an acyl radical containing both an organic group and sulphur, so as to yield a floating concentrate, and separating the concentrate.

13. The process of concentrating an ore which includes agitating a pulp of the ore with a compound containing an acid radical of an organic monothioacid which includes an alcohol-forming group, and also containing an acyl radical, so as to yield a floating concentrate, and separating the concentrate.

14. The process of concentrating an ore which includes agitating a pulp of the ore with a compound consisting of an acyl radical united with the acid radical of a metal organic monothiocarbonate, so as to yield a float concentrate, and separating the concentrate.

15. The process of concentrating an ore which includes agitating a pulp of the ore with the reaction product of an acyl chloride and a metal organic monothiocarbonate under such conditions as to yield a mineral-bearing float concentrate, and separating the concentrate.

16. The process of concentrating an ore which includes agitating a pulp of the ore with the reaction product of an acyl chloride and a metal organic monothiocarbonate carried in acetone so that the pulp yields a floating concentrate, and separating the concentrate.

17. The process of concentrating an ore which includes agitating a pulp of the ore with the reaction product of an acyl chloride and an excess of a metal organic monothiocarbonate carried in acetone so that the pulp yields a floating concentrate, and separating the concentrate.

WILLIAM TROTTER.
ELTOFT WRAY WILKINSON.